(12) United States Patent
Masui

(10) Patent No.: US 6,235,232 B1
(45) Date of Patent: May 22, 2001

(54) SYNTHETIC RESIN HOSE AND METHOD FOR PRODUCING THE SAME

(75) Inventor: Hiroyuki Masui, Osaka (JP)

(73) Assignee: Totaku Industries, Inc., Tokyo (JP)

( * ) Notice: Subject to any disclaimer, the term of this patent is extended or adjusted under 35 U.S.C. 154(b) by 0 days.

(21) Appl. No.: 09/301,148

(22) Filed: Apr. 30, 1999

Related U.S. Application Data

(62) Division of application No. 08/874,739, filed on Jun. 13, 1997, now Pat. No. 5,944,059.

(30) Foreign Application Priority Data

Jun. 14, 1996 (JP) .................................................... 8-175699

(51) Int. Cl.$^7$ .................................................... B29C 47/02
(52) U.S. Cl. ......................... 264/508; 264/514; 264/516; 264/171.14
(58) Field of Search .................................. 264/908, 516, 264/171.14, 514, 565, 566, 511

(56) References Cited

U.S. PATENT DOCUMENTS

| | | |
|---|---|---|
| 2,927,625 | 3/1960 | Rothermal et al. . |
| 2,941,571 | 6/1960 | Rothermal . |
| 3,080,891 | 3/1963 | Duff . |
| 3,084,086 | 4/1963 | Roberts et al. . |
| 3,275,038 | 9/1966 | Roberts et al. . |
| 3,674,056 | 7/1972 | D'Aprile . |
| 3,872,893 * | 3/1975 | Roberts ................................ 264/89 |
| 4,091,063 | 5/1978 | Logan . |
| 4,380,253 | 4/1983 | Mead et al. . |
| 4,555,230 * | 11/1985 | Lupke .................................. 425/325 |
| 4,698,890 * | 10/1987 | Neaves ................................. 29/412 |
| 4,721,637 | 1/1988 | Suzuki et al. . |
| 5,416,270 | 5/1995 | Kanao . |
| 5,555,915 | 9/1996 | Kanao . |

FOREIGN PATENT DOCUMENTS 4-193048  7/1993 (JP) .

\* cited by examiner

Primary Examiner—Jan H. Silbaugh
Assistant Examiner—Stefan Staicovici
(74) Attorney, Agent, or Firm—McGuireWoods, LLp

(57) ABSTRACT

A producing method of a hose including, using a mold assembly constituted by a pair of semicylindrical molds each having a large number of intrusion grooves formed along the axial direction in the cylindrical surface of each of the semicylindrical molds substantially at regular intervals and supplying electrically conductive wire into the hose molding mold assembly substantially linearly along the axial direction of the mold assembly; extruding a molten resin tubularly to supply the molten resin into the mold assembly after the supply of the electrically conductive wire; supplying high-pressure air into the inside of the thus extruded molten resin tube to thereby expand the molten resin tube along the corrugated surface of the mold assembly to bring the molten resin tube into contact with the corrugated surface of the mold assembly and, at the same time, making a part of the tube go around to the outer circumferential surface side of the electrically conductive wire along the intrusion grooves of the mold assembly to thereby enclose the outer circumferential side of the electrically conductive wire; cooling the molded resin tube to retain the shape of the tube; and opening the mold assembly so that a hose body integrated with the electrically conductive wire is taken out from the mold assembly.

4 Claims, 12 Drawing Sheets

SYNTHETIC RESIN HOSE AND METHOD FOR PRODUCING THE SAME

This is a divisional of U.S. patent application Ser. No. 08/874,739, filed on Jun. 13, 1997, now U.S. Pat. No. 5,944,059, the contents of which is incorporated by reference into the present application.

BACKGROUND OF THE INVENTION

The present invention relates to a synthetic resin hose containing electrically conductive wire adapted for an antistatic hose, an electric cleaner hose, a reservoir water pump hose, and so on, and a method for producing the same.

A conventional synthetic resin hose of this type containing electrically conductive wire is generally configured so that resin-coated rigid steel wire for retaining the shape of the hose and resin-coated electrically conductive wire for current conduction are helically wound on the hose along the circumference of the hose, and a hose wall is fitted and stuck onto the outer circumferential surfaces thereof. On the other hand, there is generally known a synthetic resin hose which is configured so that a wall of the hose is formed of two layers, that is, inner and outer layers, and either one of or both of rigid steel wire and coated electrically conductive wire are helically put between the two layers.

As described above, each of the conventional general synthetic resin hoses with electrically conductive wires is configured so that rigid steel wire and electrically conductive wire are helically disposed over the whole length of the hose to thereby utilize the strength of the rigid steel wire to retain the shape of the hose body.

Accordingly, this kind of conventional synthetic resin hose with electrically conductive wire has a problem that the weight of the synthetic resin hose as a whole is heavy, and large fatigue is caused when the hose is pulled in use, because rigid steel wire for retaining the shape of the hose and electrically conductive wire are helically disposed over the whole length of the hose.

SUMMARY OF THE INVENTION

Therefore, an object of the present invention is to solve the problem in the conventional synthetic resin hose with electrically conductive wire, and to provide a synthetic resin hose with electrically conductive wire, which is configured so that the shape of the hose is retained by use of the shape retention of the hose wall per se without use of any rigid steel wire as a reinforcing wire material and the wiring structure of electrically conductive wire is provided as such a special wiring structure as the electrically conductive wire has substantially the smallest length and is supported to the tube wall securely without use of any adhesive agent or the like, to thereby attain great reduction of the weight of the hose as a whole and form a structure in which fatigue is little even in the case where the hose is pulled in use for a long time.

The synthetic resin hose according to the present invention in order to achieve the foregoing object includes a tube wall formed corrugatedly in a direction of its axis, and an electrically conductive wire or a coated electrically conductive wire disposed over the whole length of the tube wall, in which the electrically conductive wire or coated electrically conductive wire is disposed substantially straight along the direction of the axis of the tube wall and configured so that the whole length of the electrically conductive wire or coated electrically conductive wire in the inner circumferential surface side thereof is covered with the tube wall and the outer circumferential side thereof is enclosedly covered with peak portions of the tube wall.

Further, the method for producing a hose having such a structure as described above comprises the steps of: using a hose molding mold assembly constituted by a pair of semicylindrical molds each having a large number of intrusion grooves formed along the axial direction in the cylindrical surface of each of the semicylindrical molds substantially at regular intervals and supplying electrically conductive wire or a coated electrically conductive wire into the hose molding mold assembly substantially linearly along a direction of the axis of the mold assembly; extruding a molten resin tubularly to supply the molten resin into the mold assembly after the supply of the electrically conductive wire or coated electrically conductive wire; supplying high-pressured air into the inside of the thus extruded molten resin tube to thereby expand the molten resin tube along the corrugated surface of the mold assembly from the inner circumferential surface side of the electrically conductive wire or coated electrically conductive wire to bring the molten resin tube into contact with the corrugated surface of the mold assembly and, at the same time, making a part of the tube go around to the outer circumferential surface side of the electrically conductive wire or coated electrically conductive wire along the intrusion grooves of the mold assembly to thereby enclose the outer circumferential side of the electrically conductive wire or coated electrically conductive wire in the part of the tube; cooling the molded resin tube to retain the shape of the tube T; and opening the mold assembly so that a hose body integrated with the electrically conductive wire or coated electrically conductive wire is taken out from the mold assembly. Incidentally, not only means (blow molding means) for supplying high-pressure air into the tube but also means (vacuum molding means) for sucking air around the outside of the tube from the outside can be used additionally as the expansion molding means for the molten resin tube.

In the aforementioned synthetic resin hose or in the aforementioned hose producing method, the coated electrically conductive wire may be in which electrically conductive wire is helically wound on a fiber yarn excellent in flexibility as an axial yarn and the outer circumference of the wire is covered with an electrically insulating material, or may be a wire in which fiber strings excellent is flexibility and electrically conductive wires are mixed and twisted in the form of a twisted yarn and the outer circumference of the twisted yarn is covered with an electrically insulating material. Consequently, it is possible to obtain a synthetic resin hose containing electrically conductive wire which is hardly broken even in the case where bending or contraction and expansion of the hose is repeated, by use of such an electrically conductive cable.

Further, in the case where the electrically conductive wire or coated electrically conductive cable is used, for example, as an electrostatic induction line or an earth line in an antistatic hose, the hose may be practiced as: a hose containing only one line wired; a hose containing one-round-trip lines (two lines) wired as a signal line or a drive power transmission line or containing two-round-trip lines (four lines) or one-round-trip lines and one earth line (three lines in total) collectively wired in parallel in one place as a signal line as well as a drive power transmission line; or a hose containing those lines wired substantially in two opposite places separately. Further, the synthetic resin material forming the hose wall is not limited specifically but polyolefin resin represented by polyethylene, polypropylene, etc. is preferred in terms of good self-restoration against contractive deformation due to external force.

Further, in the producing method, the structure of the mold assembly may be formed not only into a structure in which the mold assembly is constituted by semicylindrical molds each having a large number of intrusion grooves formed in the cylindrical surface thereof substantially at regular intervals along the axial direction but also into a structure in which the hose molding mold assembly contains a linear groove formed substantially straight along the axial direction so as to be shallower than the intrusion grooves and independent of the intrusion grooves so that the electrically conductive wire or coated electrically conductive wire may be supplied into the mold assembly along the linear groove of the mold assembly. The linear groove may be designed so that only one electrically conductive wire or coated electrically conductive wire can be disposed therein. Otherwise, the linear groove may be designed to have such a width that not only one but also two, three or four wires can be disposed in parallel therein. Further, one linear groove may be formed in one place or two linear grooves may be formed substantially in two opposite places.

Because the synthetic resin hose according to the present invention is configured as described above, the hose can be used in the same manner as the conventionally known general synthetic resin hose. Further, in the case where the hose configured as described above is used as an electric cleaner hose, a connection pipe to be inserted into and connected to a joint port of a cleaner operation pipe can be connected to one end side of the hose, and a connection pipe to be inserted into a suction port of a cleaner body can be connected to the opposite end side of the hose. The synthetic resin hose according to the present invention little gives a feeling of fatigue to a user so that the hose can be used while keeping a state of less feeling of resistance when the hose is used as an electric cleaner hose attached to a cleaner, because the weight of the hose as a whole is light.

DETAILED DESCRIPTION OF THE INVENTION

Preferred embodiments of the present invention will be described below with reference to the drawings.

Figure 1:
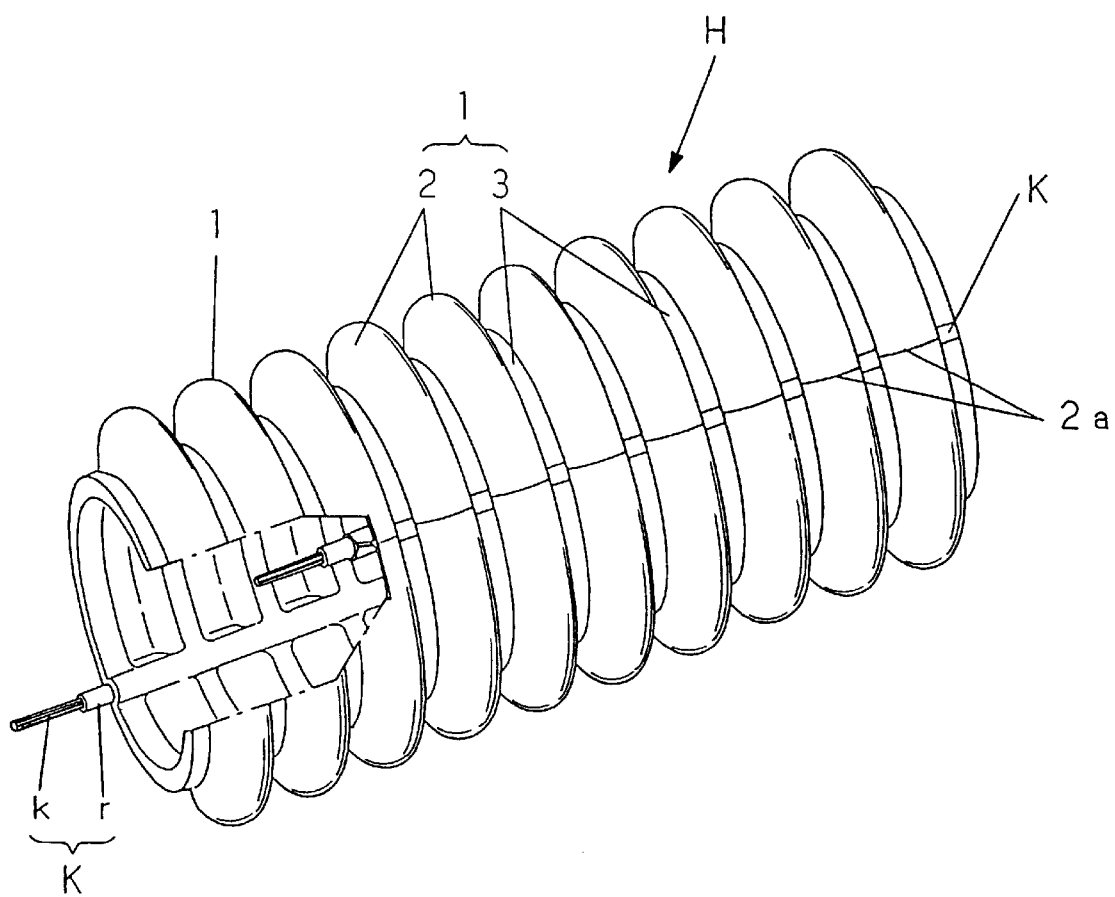
FIG. 1 is a partly cutaway external appearance view of a hose according to a first embodiment.
Figure 2:
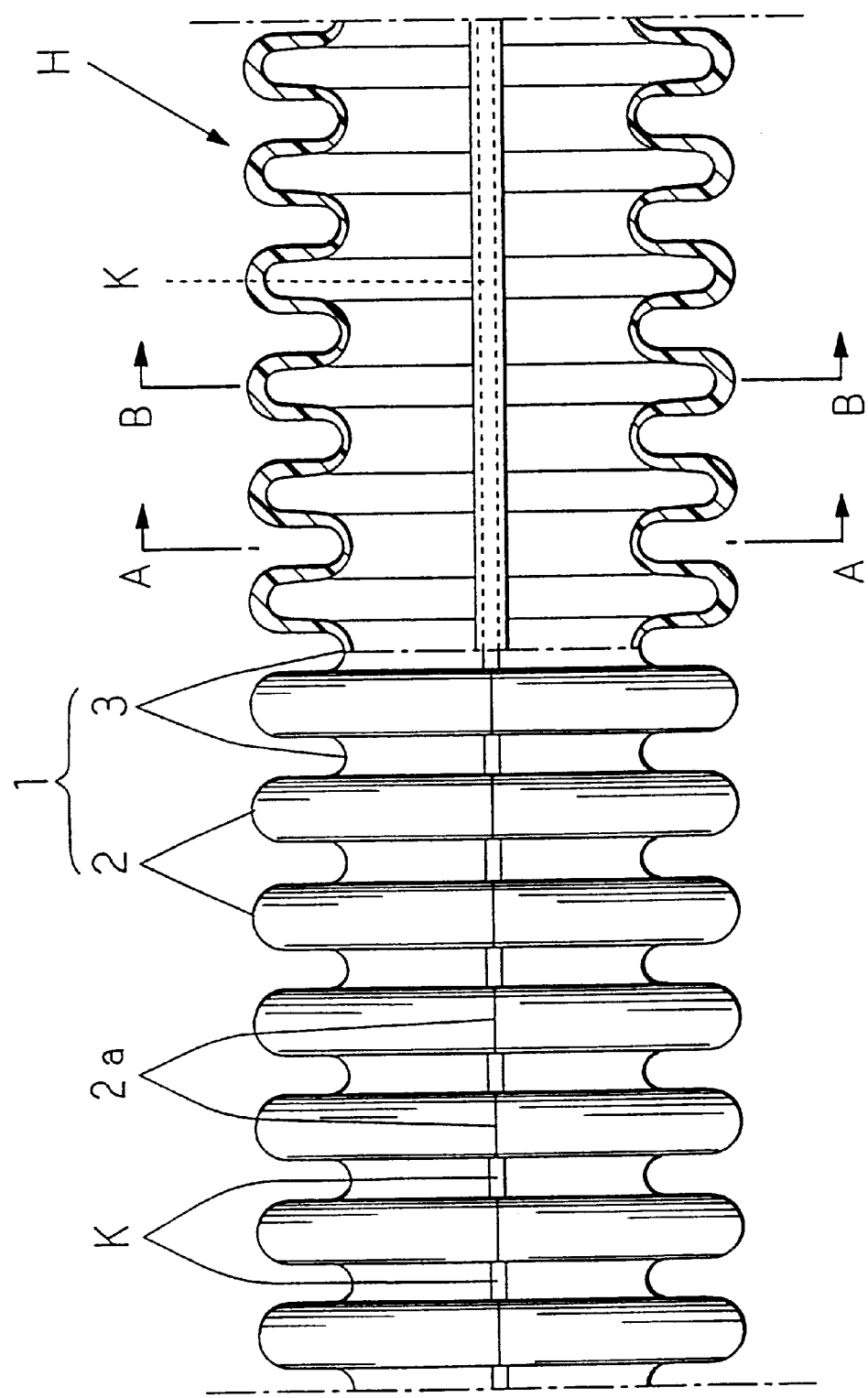
FIG. 2 is a partly vertical sectional side view of an intermediate portion of a tube wall of the hose of FIG. 1.
Figure 3:
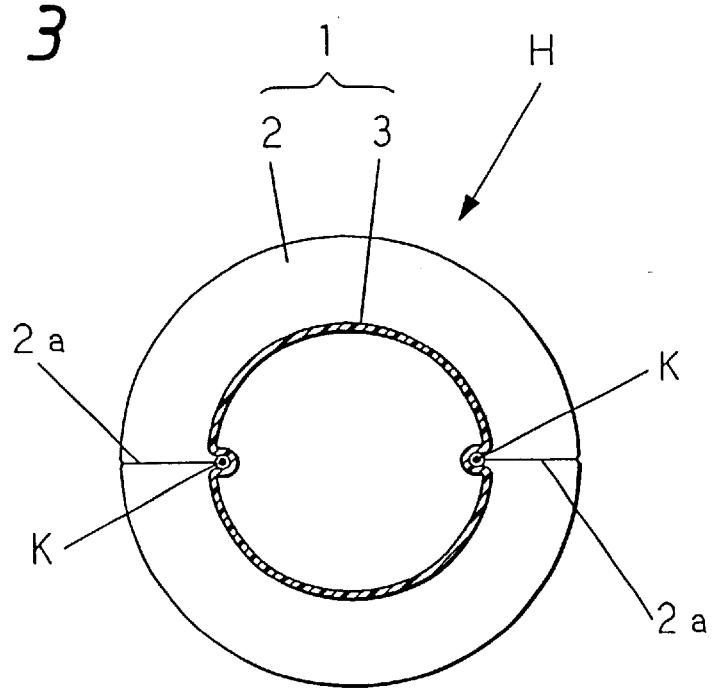
FIG. 3 is a sectional view taken along line A—A in FIG. 2.
Figure 4:
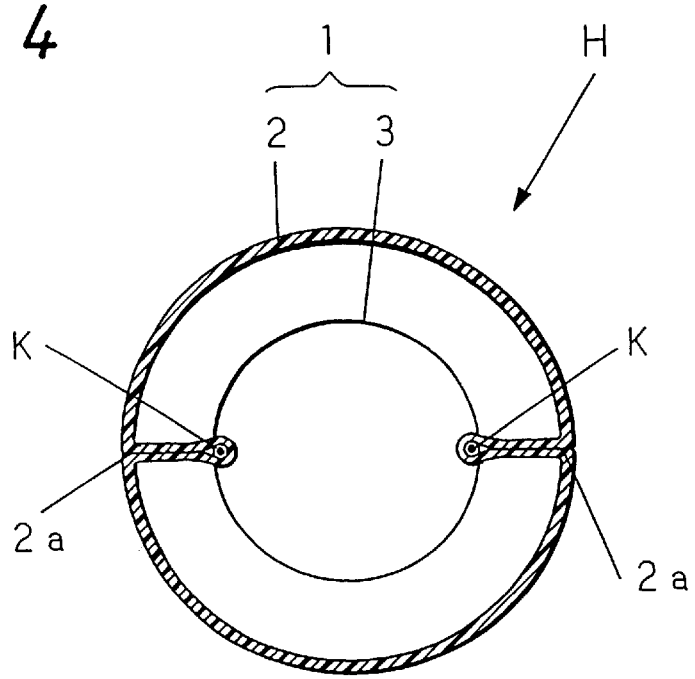
FIG. 4 is a sectional view taken along line B—B in FIG. 2.
Figure 5:
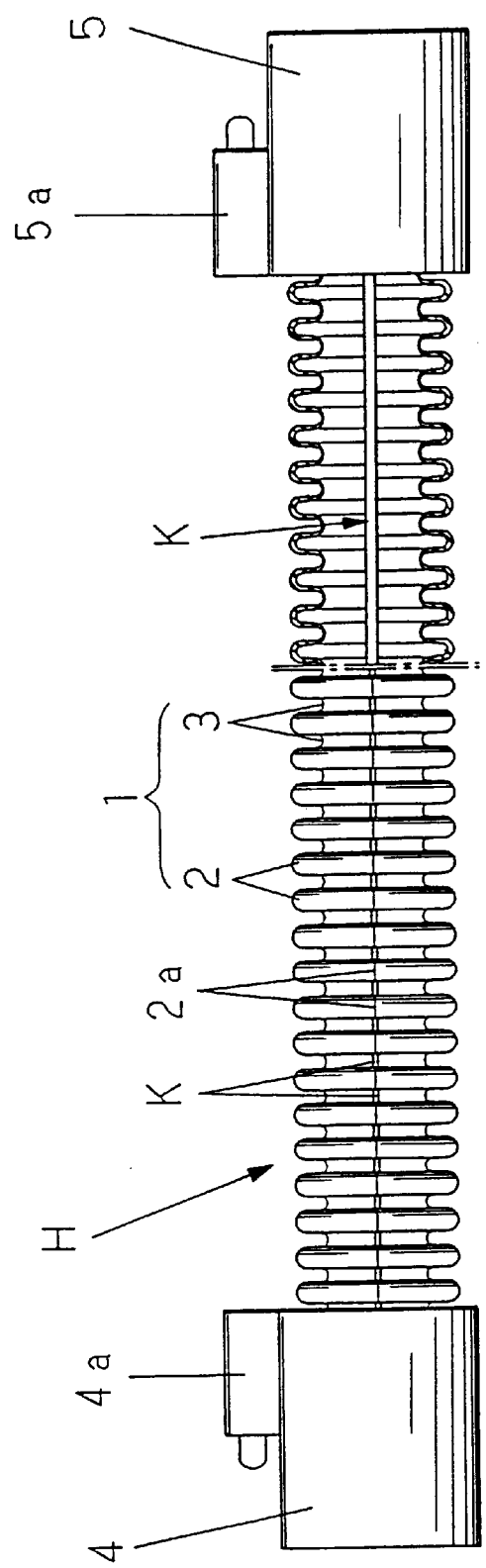
FIG. 5 is a partly vertical sectional overall external appearance view of the hose of the first embodiment having its intermediate portion omitted.
Figure 6:
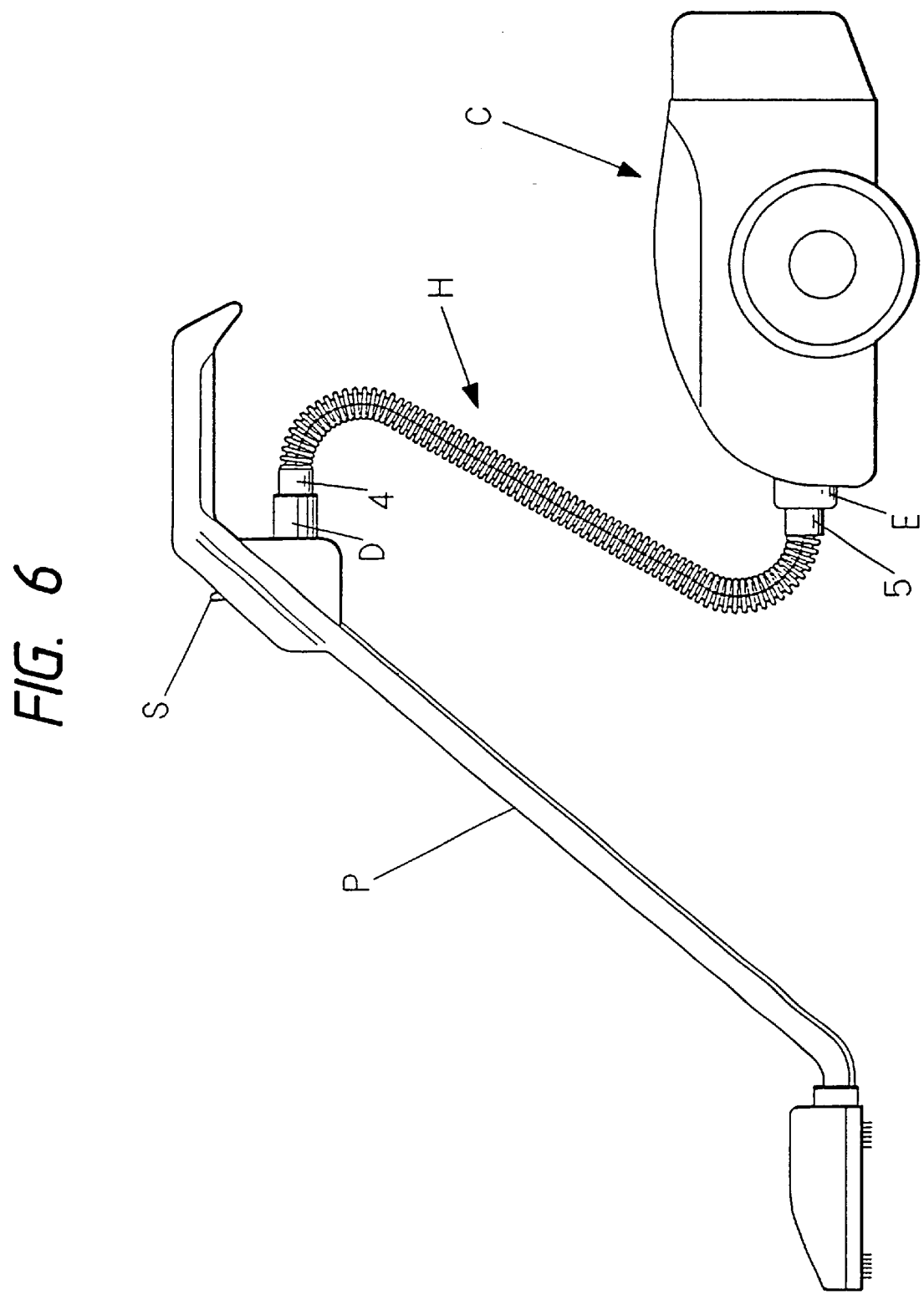
FIG. 6 is a side view showing a state of use of the hose of the first embodiment.

In the drawings, FIGS. 1 through 6 are views showing a first embodiment of the present invention. FIG. 1 is a partly cutaway external appearance view of a hose body H. FIG. 2 shows a side shape and a centrally sectional shape thereof. FIGS. 3 and 4 show sectional shapes of a tube wall cut along lines A—A and B—B in FIG. 2. FIG. 5 shows an overall shape of a structure as a cleaner hose obtained by omission of an intermediate portion of the hose body H. FIG. 6 is a view showing a state of use of the cleaner hose.

In the synthetic resin hose of the present invention, for example, a tube wall 1 is formed of a polyethylene resin tube axially corrugated like bellows as shown in FIGS. 1 through 4, and the corrugated shape of the tube wall 1 is designed so that the depth of the corrugation is larger than the axial width of each top portion 2 or than the axial width of each valley portion 3 as shown in FIG. 2. By this measure, there is obtained a structure in which the shape of the tube wall 1 is easily self-restored even in the case where the shape of the tube wall 1 per se is deformed by external pressure. Coated electrically conductive wires K containing a bundle of copper small-gage wires as an electrically conductive wire "k" coated with a resin electrically insulating material "r" so as to be electrically insulated are made to have a structure such that they are disposed in two circumferentially opposite places of the tube wall 1 so as to extend axially and linearly. As shown in FIGS. 3 and 4, the coated electrically conductive wires K are disposed so that the whole of each wire K projects inward from a virtual inner circumferential surface of the tube wall 1. The whole length in the inner circumferential surface side of each wire K is covered with the tube wall 1. On the outer circumferential side of each wire K, a portion located in the outside of each valley portion 3 of the tube wall 1 is exposed. In a portion corresponding to each peak portion 2 of the tube wall 1, resin materials forming the peak portion go around from opposite sides of the coated electrically conductive wire K to the outer circumferential surface side so as to abut on each other as represented by an abutting line 2a in FIG. 1 so that the coated electrically conductive wire K is enclosedly covered with the resin materials.

To use the hose having such a structure as described above as a cleaner hose, after the hose body H is cut into a predetermined length, as shown in FIGS. 5 and 6, a connection pipe 4 for connecting the cut hose body H to a joint port D in a cleaner operation pipe P is connected and fixed to one end side of the cut hose body H by an adhesive agent, and a connection pipe 5 for connecting the cut hose body H to a suction port E in a cleaner body C is connected and fixed to the opposite end side of the cut hose body H by an adhesive agent and, at the same time, the electrically conductive wires "k" of the coated electrically conductive wires K are connected and coupled to connectors 4a and 5a in opposite sides.

To use the cleaner hose having such a structure as described above, after the connection pipe 4 in one end side of the hose is inserted into the joint port D of the cleaner operation pipe P, and the connection pipe 5 in the opposite end side of the hose is inserted into the suction port E of the cleaner body C as shown in FIG. 6 and, at the same time, after the respective connectors 4a and 5a are electrically connected, a switch S can be operated to be turned on and off.

The frequency of vertical shaking and the angle of vertical bending in use of the cleaner hose configured as described above are several times as much as the frequency of horizontal shaking and the angle of horizontal bending. Accordingly, if the hose body H is connected to the connection pipes 4 and 5 while the positions of the connectors 4a and 5a are taken into account so that the coated electrically conductive wires K are located in opposite lateral sides of the hose body H when the clear hose is connected both to the cleaner operation pipe P and to the cleaner body C as shown in FIG. 6, a risk of cable breaking is conveniently reduced greatly so that the cleaner hose can be used for a long time.

Figure 9:
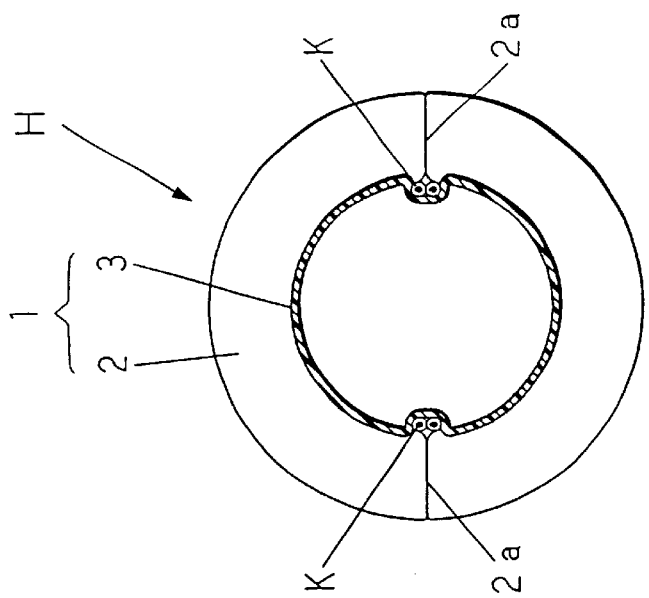
FIG. 9 is a sectional view of a portion corresponding to FIG. 3, showing a further embodiment.
Figure 8:
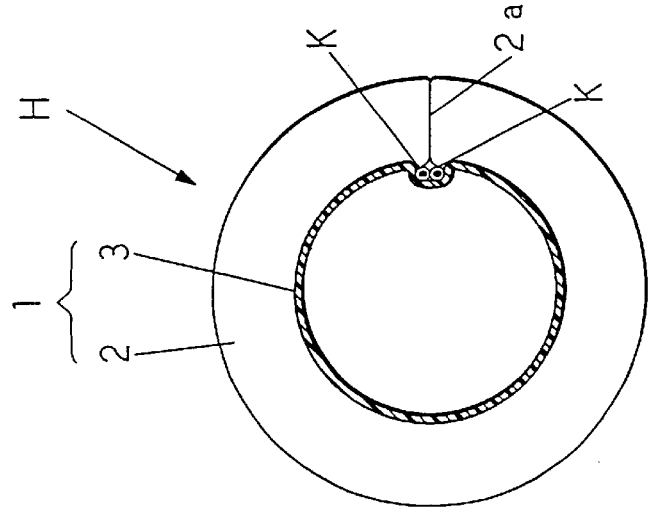
FIG. 8 is a sectional view of a portion corresponding to FIG. 3, showing a further embodiment.
Figure 7:
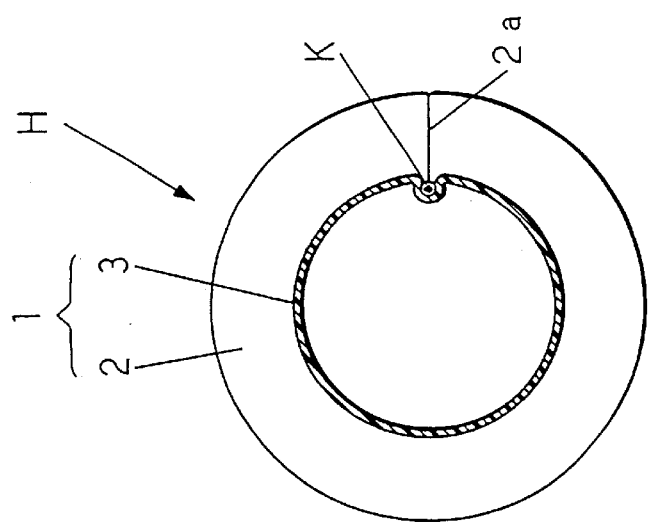
FIG. 7 is a sectional view of a portion corresponding to FIG. 3, showing another embodiment.

FIGS. 7 through 9 respectively show other embodiments of the synthetic resin hose H. The hose H in the embodiment shown in FIG. 7 is configured so that there is disposed only one coated electrically conductive wire K for the tube wall 1. The coated electrically conductive wire K is mainly used as an earth line. The synthetic resin hose H in the embodiment shown in FIG. 8 is configured so that two coated electrically conductive wires K, K are collectively disposed in one place. Further, the synthetic resin hose H in the embodiment shown in FIG. 9 is configured so that two pairs of coated electrically conductive wires K . . . are disposed in two opposite places of the tube wall 1, respectively.

Figure 10:
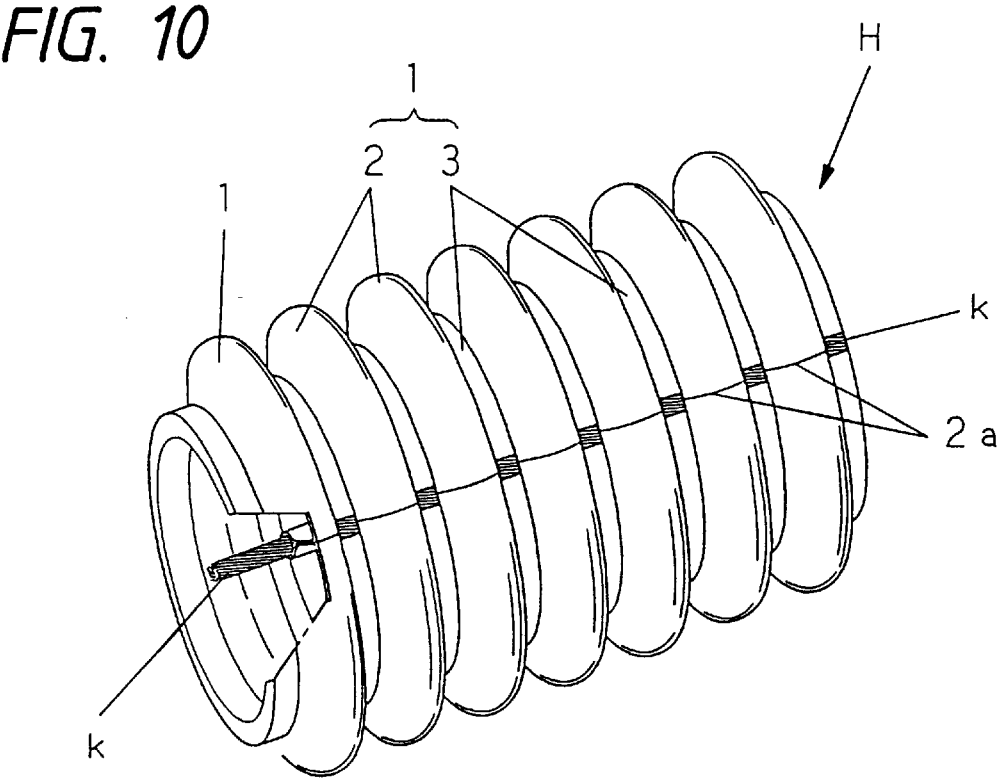
FIG. 10 is an external appearance view of a portion corresponding to FIG. 1, showing a further embodiment of a hose.
Figure 11:
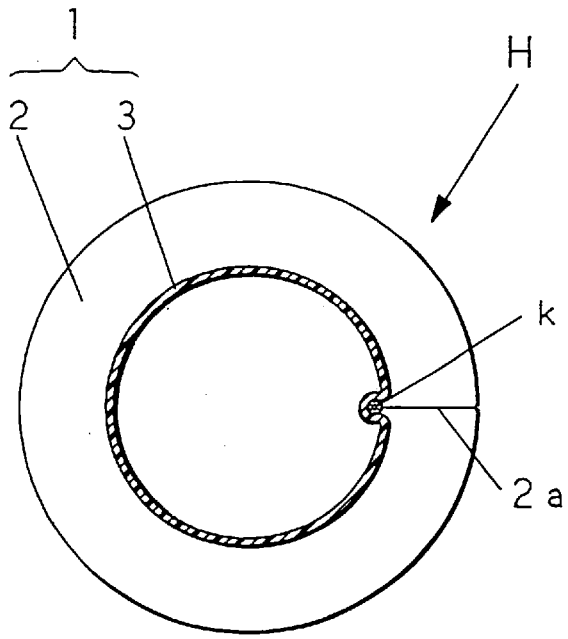
FIG. 11 is a sectional view of a portion of the hose of FIG. 10, corresponding to FIG. 3.

The hose H in an embodiment shown in FIGS. 10 and 11 is made to have a structure in which only one electrically conductive wire "k" with no coating is disposed for the tube wall 1 to form a straight line. Accordingly, the electrically conductive wire "k" is configured so that the bare wire in the outer circumferential surface of each valley portion 3 of the tube wall 1 is exposed to the outside. When the hose H thus configured is used as an antistatic hose, the electrically conductive wire "k" can be designed to be used as an electrostatic induction line or an earth line. The hose stated in the present invention can be achieved as such a structure.

Figure 12:
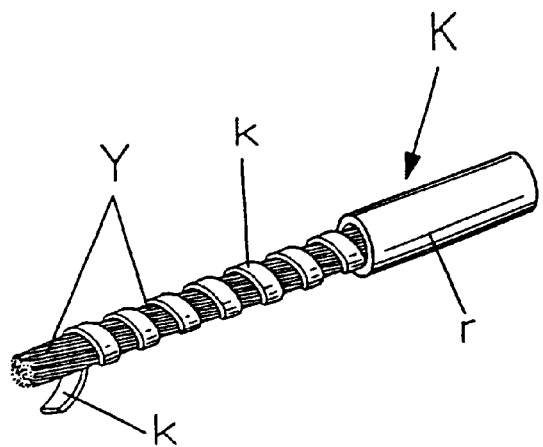
FIG. 12 is a perspective view showing a coated electrically conductive wire.
Figure 13:
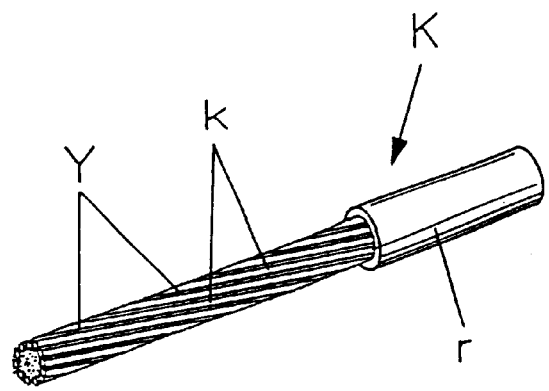
FIG. 13 is a perspective view showing another coated electrically conductive wire.

FIGS. 12 and 13 show examples of the coated electrically conductive wire K, respectively. The coated electrically conductive wire K shown in FIG. 12 is formed so that an electrically conductive wire "k" shaped like a flat small-gauge cord or belt is helically wound on a fiber collective yarn Y excellent in flexibility as an axial yarn and the outer circumference of the electrically conductive wire "k" is covered with an electrically insulating resin r. The coated electrically conductive cable K shown in FIG. 13 is formed so that fiber filaments or strings Y excellent in flexibility and electrically conductive wires "k" are mixed and twisted in the form of a twisted yarn and the outer circumference of the twisted yarn is covered with an electrically insulating material. When the coated electrically conductive wire K thus configured is used, the fiber yarn Y serves as a cushion to allow the electrically conductive wire to expand in the case where a tensile force is applied to the electrically conductive wire k. Accordingly, the coated electrically conductive wire K can be used as an electrically conductive wire hardly broken even by repetitive bending, contraction and expansion of the hose. Accordingly, the coated electrically conductive wire K is suitable as an electrically conductive wire for the synthetic resin hose stated in the present invention.

A method for producing a hose body H configured as described above will be described below with reference to FIG. 14. Taking into account the convenience sake of description and the easiness to understand the drawing, a hose provided with only one coated electrically conductive wire K shown in the embodiment of FIG. 7 will be described.

Figure 14:
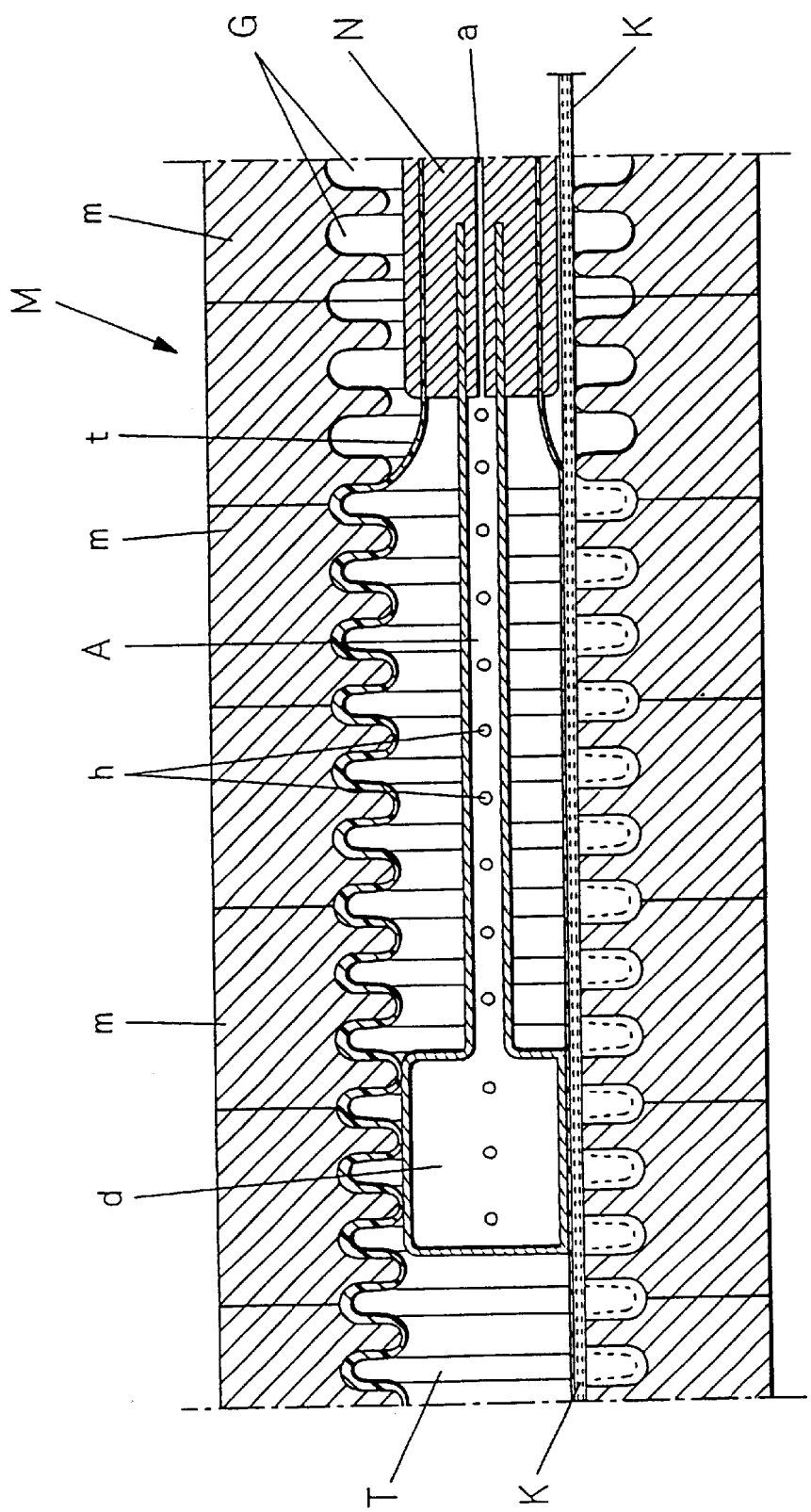
FIG. 14 is a vertical sectional side view of a main part of a mold assembly, for explaining a producing method of the hose.

A mold assembly M shown in FIG. 14 is a mold assembly for a known travelling mold type hose molding apparatus in which a large number of unit molds "m" each having a semicylindrical molding surface are connected to one another with no ends so that two parts are disposed so as to be opposite to each other. In the molding cylindrical surface of each of the unit molds "m" . . . , a large number of intrusion grooves G are formed substantially at regular intervals along the axial direction. While the mold assembly M is moved forward (left in FIG. 14) successively, the coated electrically conductive wire K is supplied from the resin extruder side (right in FIG. 14) into the mold assembly M substantially straight along the axial direction in the lower portion of the mold assembly M. After the coated electrically conductive wire K is supplied, a molten resin is extruded tubularly from an annular resin extrusion hole formed in a nozzle N of a resin extruder so as to be supplied into the mold assembly M.

At the same time, high-pressure air is supplied into the inside of the extruded molten resin tube t through small holes "h" formed in an air supply pipe A having an air extraction prevention drum "d" at its head portion and having its base portion fixed to the nozzle N, via an air supply hole "a" formed in the center portion of the nozzle N so as to pierce the nozzle N. If necessary, a suction hole is formed in the mold assembly M so that the tube "t" is sucked. The molten resin tube "t" is expanded along the corrugated surface of the mold assembly M from the inner circumferential surface side of the coated electrically conductive cable K so as to be forced to abut on the respective intrusion grooves G . . . of the mold assembly M. The tube "t" is further expanded to go around to the outer circumferential surface side of the coated electrically conductive cable K along the intrusion grooves G of the mold assembly M and end portions of the expanded tube are brought into contact with and fusion-bonded to each other so that the outer circumferential side of the coated electrically conductive wire K is enclosed in the portions of the tube "t". Consecutively, the resin tube T thus expanded and molded is cooled to be solidified and shape-retained in the mold assembly M to such an extent that the resin tube T does not get out of shape. Then, the mold assembly M is opened so that the hose thus integrated with the coated electrically conductive wire K is separated from and taken out of the mold assembly M.

Figure 15:
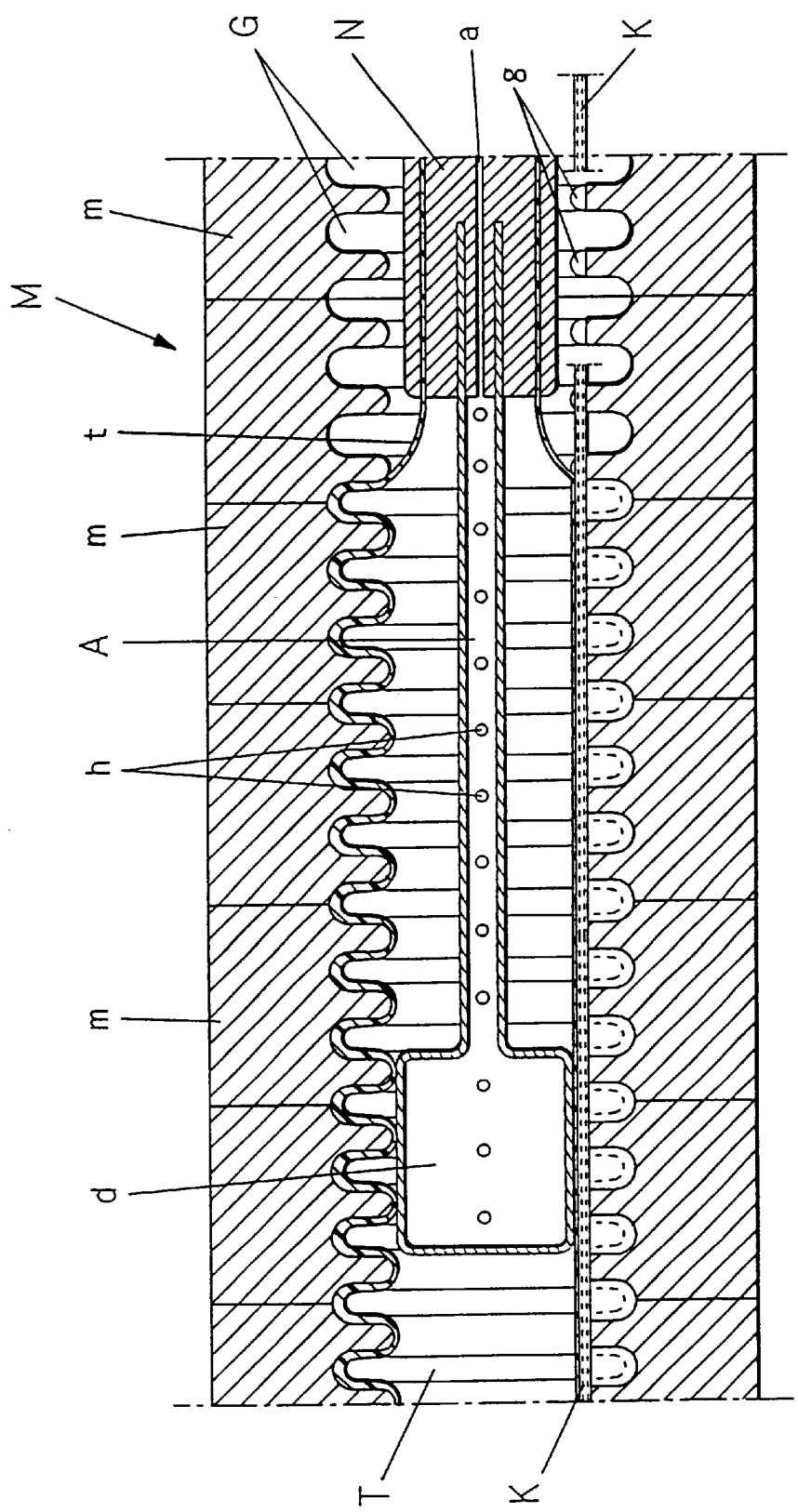
FIG. 15 is a vertical sectional side view of a portion corresponding to FIG. 14, for explaining another producing method.

The hose thus molded is a hose having one coated electrically conductive wire K disposed in one place of the hose. It can be understood easily that the hose shown in the first embodiment is obtained if such coated electrically conductive wires K are supplied to two opposite places of the mold assembly M. Also, it can be understood easily that the hoses having the structures described in FIGS. 8 and 9 can be obtained FIG. 15 is a view for explaining another producing method. In the producing method, the structure of the mold assembly M is such that a linear groove "g" shallower than the intrusion grooves G is provided substantially straight along the axial direction in addition to the intrusion grooves G formed substantially at regular intervals in the inner surface of the mold assembly M. In this embodiment, the linear groove "g" is formed to have a depth equal to the sum of the diameter of the coated electrically conductive cable K and the thickness of each valley portion 3 forming the tube wall 1. Using the hose molding mold assembly configured as described above, the coated electrically conductive wire K is supplied into the mold assembly M along the linear groove "g". The hose is molded in the same manner as in the aforementioned producing method except this point.

The hose thus formed can be provided as a hose with no projection stripe projecting inward from the inner surface of the hose body H. The depth of the linear groove "g" is not limited to the aforementioned depth but can be achieved as an arbitrary depth so long as the linear groove "g" is shallower than the intrusion grooves G. Further, the width of the linear groove "g" is not limited to a width allowing only one coated electrically conductive cable K to be disposed therein, and the linear groove "g" may have a width allowing two or four cables to be disposed in parallel therein. Further, the linear groove "g" need not be disposed in only one place of the mold assembly M, and such linear grooves "g" may be disposed substantially in two opposite places of the mold assembly M, respectively.

Figure 16:
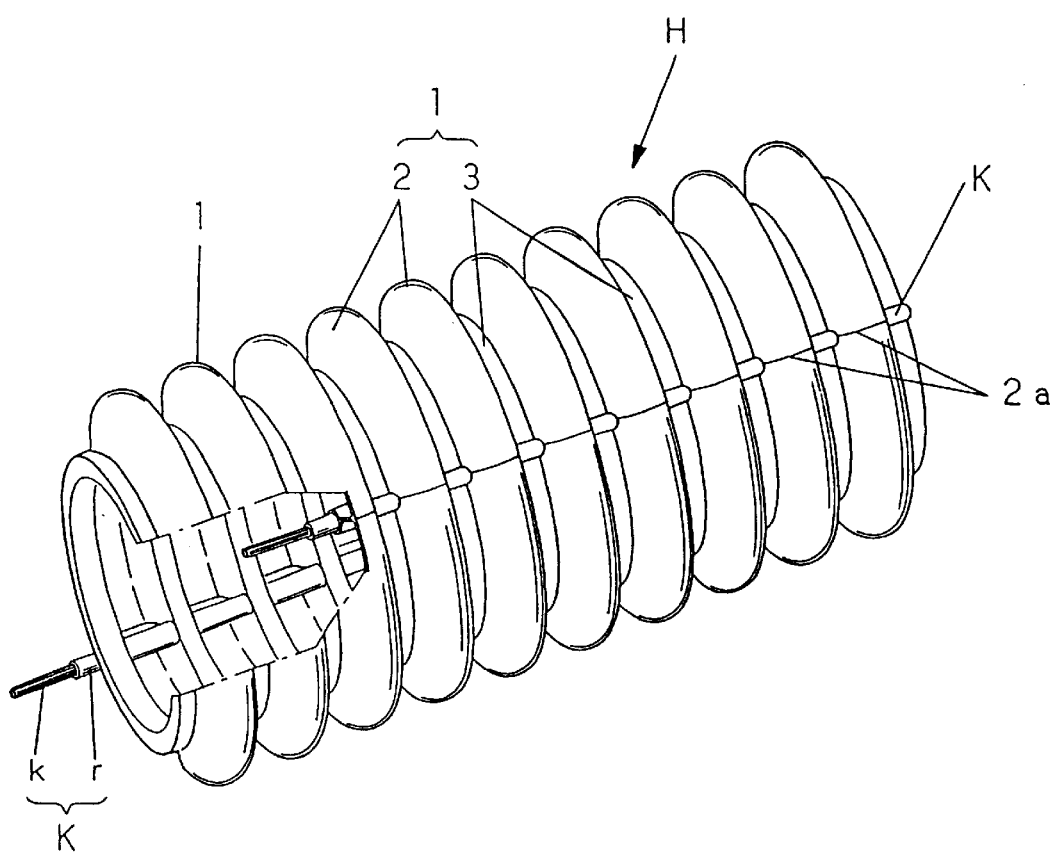
FIG. 16 is an external appearance view of a portion corresponding to FIG. 1, showing a further embodiment of a hose.
Figure 17:
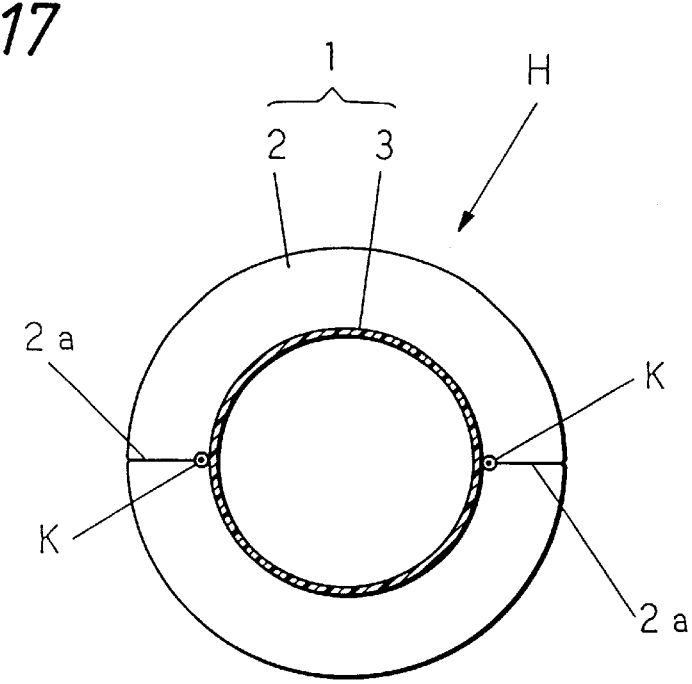
FIG. 17 is a sectional view of a portion of the hose of FIG. 16, corresponding to FIG. 3.
Figure 18:
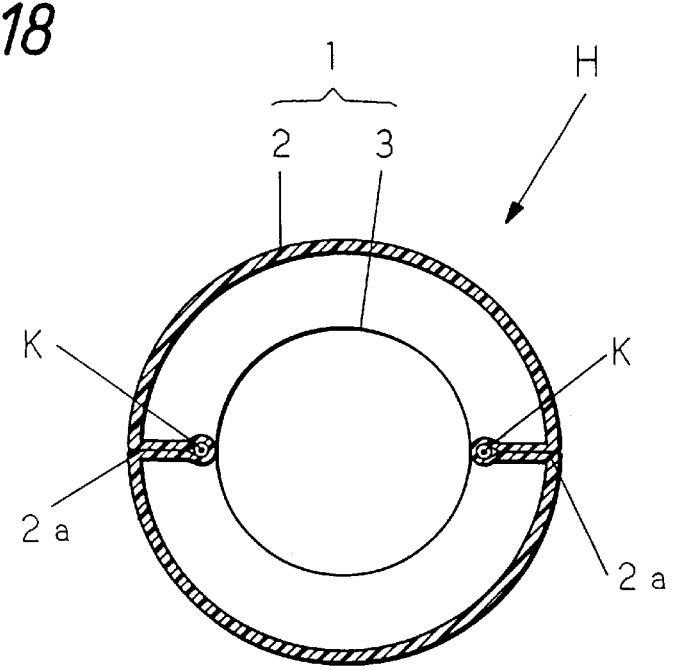
FIG. 18 is a sectional view of a portion of the hose of FIG. 16, corresponding to FIG. 4.

The structure of the hose produced by use of the mold assembly M having linear grooves "g" formed in two opposite places of the hose is as shown in FIGS. 16 through 18. There can be obtained a hose which contains two coated electrically conductive wires K, K disposed in two opposite places of the hose respectively and which as a cylindrical inner diameter with no portion projecting inward from the inner surface of the hose body H.

Although typical embodiments of the present invention have been described above, the present invention is not always limited only to the structure of these embodiments. Changes of the invention may be made suitably within the range of the following effect so long as the aforementioned constitutional elements for the present invention can be satisfied and the object of the present invention can be achieved.

As is apparent from the above description, the synthetic resin hose according to the present invention is configured so that a bare electrically conductive wire or a resin-coated electrically conductive wire is disposed linearly along the axial direction of the hose so as to have the smallest length with the shape retention of the hose using effectively the shape retention of the hose wall per se without use of any heavy-weight rigid steel cable in the hose body. Accordingly, because the weight of the hose as a hole is reduced greatly, there can be conclusively expected a remarkable effect that the hose can be used with little feeling of fatigue even in the case where the hose is pulled continuously in use for a long time.

Further, the method for producing a synthetic resin hose according to the present invention has an economically remarkable advantage that the synthetic resin hose having the aforementioned remarkable effect can be produced by use of a mold assembly used for producing a general bellows hose without any process of producing of novel mold assembly or without application of any complex process.

What is claimed is:

1. A method for producing a synthetic resin hose comprising the steps of:
   preparing a hose molding mold assembly constituted by a pair of semicylindrical molds each having a large number of intrusion grooves formed along an axial direction of said mold assembly in a cylindrical surface of each of said semicylindrical molds substantially at regular intervals to provide a corrugated surface;
   supplying an electrically conductive wire or a coated electrically conductive wire into said mold assembly substantially linearly along the axial direction of said mold assembly;
   extruding a molten resin tube into said mold assembly after the supply of said electrically conductive wire or coated electrically conductive wire, said electrically conductive wire or coated electrically conductive wire being positioned between said tube and said corrugated surface;
   supplying high-pressure air into an inside of the extruded molten resin tube to thereby expand said molten resin tube along the corrugated surface of said mold assembly from an inner circumferential surface side of said electrically conductive wire or coated electrically conductive wire to bring said molten resin tube into contact with the corrugated surface of said mold assembly and, at the same time, making a part of said tube go around to an outer circumferential surface side of said electrically conductive wire or coated electrically conductive wire along said intrusion grooves of said mold assembly to thereby enclose the outer circumferential side of said electrically conductive wire or coated electrically conductive wire in said part of said tube;
   cooling said molded molten resin tube to retain the shape of said tube; and
   opening said mold assembly so that a hose body integrated with said electrically conductive wire or coated electrically conductive wire is taken out of said mold assembly.

2. A method for producing a synthetic resin hose as claimed in claim 1, wherein said pair of semicylindrical molds of said hose molding mold assembly has a linear groove disposed substantially straight along the axial direction so as to be shallower in depth than said intrusion grooves; and said electrically conductive wire or coated electrically conductive wire is supplied into said mold assembly along said linear groove.

3. A method for producing a synthetic resin hose comprising the steps of:
   preparing a hose molding mold assembly constituted by a pair of semicylindrical molds each having a large number of intrusion grooves formed along an axial direction of said mold assembly in a cylindrical surface of each of said semicylindrical molds substantially at regular intervals to provide a corrugated surface;
   supplying an electrically conductive wire or coated electrically conductive wire into said mold assembly substantially linearly along the axial direction of said mold assembly;
   extruding a molten resin tube into said mold assembly after the supply of said electrically conductive wire or coated electrically conductive wire, said electrically conductive wire or coated electrically conductive wire being positioned between said tube and said corrugated surface;
   sucking air around an outside of said extruded molten resin tube to thereby expand said molten resin tube along the corrugated surface of said mold assembly from the inner circumferential surface side of said electrically conductive wire or coated electrically conductive wire to bring said molten resin tube into contact with the corrugated surface of said mold assembly and, at the same time, making part of said tube go around to an outer circumferential surface side of said electrically conductive wire or coated electrically conductive wire along said intrusion grooves of said mold assembly to thereby enclose the outer circumferential side of said electrically conductive wire or coated electrically conductive wire in said part of said tube;

cooling said molded molten resin tube to retain the shape of said tube; and opening said mold assembly to that a hose body integrated with said electrically conductive wire or coated electrically conductive wire is taken out from said mold assembly.

4. A method for producing a synthetic resin hose as claimed in claim 3, wherein said pair of semicylindrical molds of said hose molding mold assembly has a linear groove disposed substantially straight along the axial direction so as to be shallower in depth than said intrusion grooves, and said electrically conductive wire or coated electrically conductive wire is supplied into said mold assembly along said linear groove.

* * * * *